United States Patent
Murakami (10) Patent No.: US 10,554,927 B2
(45) Date of Patent: Feb. 4, 2020

(54) VIDEO SIGNAL PROCESSING APPARATUS (71) Applicant: IMAGENICS CO., LTD, Tokyo (JP)

(72) Inventor: Nobuyuki Murakami, Tokyo (JP)

(73) Assignee: IMAGENICS CO., LTD, Tokyo (JP)

( * ) Notice: Subject to any disclaimer, the term of this patent is extended or adjusted under 35 U.S.C. 154(b) by 0 days.

(21) Appl. No.: 15/992,312

(22) Filed: May 30, 2018

(65) Prior Publication Data
US 2019/0124291 A1 Apr. 25, 2019

(30) Foreign Application Priority Data

Oct. 23, 2017 (JP) .................................. 2017-204804

(51) Int. Cl.
*H04N 7/01* (2006.01)
*G06F 13/42* (2006.01)
*H04L 5/00* (2006.01)
(52) U.S. Cl.
CPC ......... *H04N 7/013* (2013.01); *G06F 13/4295* (2013.01); *H04L 5/0048* (2013.01); *H04N 7/0102* (2013.01); *H04N 7/0125* (2013.01)
(58) Field of Classification Search
None
See application file for complete search history.

(56) References Cited

U.S. PATENT DOCUMENTS

| | | | | |
|---|---|---|---|---|
| 5,530,484 A * | 6/1996 | Bhatt | ..................... | H04N 7/012 348/441 |
| 5,898,463 A * | 4/1999 | Nishiyama | ............... | H04N 5/46 348/554 |
| 6,609,251 B1 * | 8/2003 | Yoneda | ................... | H04H 20/28 348/558 |
| 6,697,122 B2 * | 2/2004 | Kim | ....................... | H04N 9/641 348/446 |
| 6,825,858 B2 * | 11/2004 | Sato | ....................... | H04L 29/06 348/552 |
| 7,068,325 B2 * | 6/2006 | Gengintani | .............. | H04N 5/21 348/526 |
| 7,206,025 B2 * | 4/2007 | Choi | ...................... | G09G 5/006 348/441 |
| 7,511,772 B2 * | 3/2009 | Fujine | .................. | G09G 3/3648 345/87 |

(Continued)

FOREIGN PATENT DOCUMENTS

| | | |
|---|---|---|
| CN | 1140950 A | 1/1997 |
| CN | 1592397 A | 3/2005 |

(Continued)

*Primary Examiner* — Brian P Yenke
(74) *Attorney, Agent, or Firm* — W&C IP (57) ABSTRACT

Provide is a video signal processing apparatus that automatically switches between input and output functions of a terminal. A video signal processing apparatus includes an input terminal, a conversion portion that converts a video signal input from the input terminal to generate a conversion signal, an input/output terminal that outputs the conversion signal, a detection portion that detects a signal input from the input/output terminal, a determination portion that determines whether the detected signal is a specific signal, and an output terminal that outputs the conversion signal in accordance with a determination result by the determination portion.

20 Claims, 5 Drawing Sheets

(56) References Cited

U.S. PATENT DOCUMENTS

| | | | | |
|---|---|---|---|---|
| 7,554,605 B2 * | 6/2009 | Chang | | H04N 5/46 348/441 |
| 7,589,789 B2 * | 9/2009 | Choi | | H04N 5/4401 348/441 |
| 7,667,774 B2 * | 2/2010 | Murakami | | H04N 5/04 348/500 |
| 7,893,996 B2 * | 2/2011 | Murakami | | H04N 5/268 348/500 |
| 8,325,236 B2 * | 12/2012 | Hallberg | | H04N 5/44 348/180 |
| 8,848,054 B2 * | 9/2014 | Jackson | | G09B 5/065 348/143 |
| 8,887,211 B2 * | 11/2014 | Ogaki | | G09G 5/00 725/80 |
| 8,934,057 B2 * | 1/2015 | Funada | | H04N 9/642 348/547 |
| 9,473,726 B2 * | 10/2016 | Ma | | G06F 3/1407 |
| 2002/0024615 A1 * | 2/2002 | Kim | | H04N 9/641 348/554 |
| 2005/0177653 A1 * | 8/2005 | Chiu | | H04N 5/765 710/15 |
| 2005/0231641 A1 | 10/2005 | Suito | | |
| 2006/0176402 A1 | 8/2006 | Hara | | |
| 2006/0221255 A1 * | 10/2006 | Okubo | | H04N 5/268 348/706 |
| 2007/0143576 A1 * | 6/2007 | Ellgen | | H04N 5/268 712/10 |
| 2007/0298656 A1 * | 12/2007 | He | | H01R 29/00 439/607.01 |
| 2008/0062328 A1 * | 3/2008 | Bilbrey | | H04N 5/765 348/705 |
| 2012/0026327 A1 * | 2/2012 | Jackson | | G09B 5/065 348/143 |
| 2013/0194498 A1 * | 8/2013 | Funada | | H04N 5/268 348/547 |
| 2015/0189127 A1 * | 7/2015 | Ishii | | H04N 5/04 348/513 |
| 2018/0316876 A1 * | 11/2018 | Gopinath | | H04N 21/4122 |

FOREIGN PATENT DOCUMENTS

| | | |
|---|---|---|
| CN | 101090557 A | 12/2007 |
| CN | 104572532 A | 4/2015 |
| JP | 2001-086416 A | 3/2001 |
| JP | 2002-94982 A | 3/2002 |
| JP | 2013-064784 A | 4/2013 |
| KR | 10-2001-0090497 A | 10/2001 |
| TW | 200721767 A | 6/2007 |

* cited by examiner

VIDEO SIGNAL PROCESSING APPARATUS

TECHNICAL FIELD

The present invention relates to a video signal processing apparatus.

BACKGROUND ART

When, for example, a video signal processing apparatus such as a scan converter displays a video output from a video output apparatus such as a personal computer (PC) and a video camera on a screen of a display apparatus such as a monitor, the video signal processing apparatus is connected between the video output apparatus and the display apparatus. The video signal processing apparatus converts a frequency of a signal (video signal) from the video output apparatus at the input side in accordance with the display apparatus at the output side, and outputs the converted signal to the display apparatus. The video signal processing apparatus includes an input terminal to which the video signal from the video output apparatus is input and an output terminal from which a processing signal provided by processing the video signal is output.

Some video signal processing apparatuses synchronize a signal from the video output apparatus with a synchronization signal and output it to the display apparatus. These video signal processing apparatuses include a synchronization signal input terminal to which the synchronization signal from a synchronization signal generation apparatus is input. That is, the video signal processing apparatuses include the synchronization signal input terminal in addition to the two types of terminals of the input terminal and the output terminal. In other words, the video signal processing apparatuses need to have areas in which the three types of terminals are disposed. Thus, reduction of the video signal processing apparatuses in size is restricted by the number of terminals.

Techniques have been proposed to reduce the apparatus in size by causing one terminal to also have functions of different terminals (for example, refer to Japanese Unexamined Patent Application Publication No. 2002-94982).

SUMMARY OF INVENTION

Technical Problem

An apparatus disclosed in Japanese Unexamined Patent Application Publication No. 2002-94982 includes one input/output terminal and a switch switching the input/output terminal into an input state. The input/output terminal is in an output state normally. By pressing the switch, the input/output terminal turns into the input state in which images can be loaded and returns to the output state after loading of the images is completed. That is, the apparatus needs a pressing operation on the switch for switching from the output state to the input state. Thus, a user of the apparatus is required to execute the pressing operation on the switch each time the user of the apparatus inputs a signal to the apparatus.

An object of the present invention is to solve the problem described above and to provide a video signal processing apparatus that automatically switches between input and output functions of a terminal.

Solution to Problem

The video signal processing apparatus according to the present invention includes an input terminal, a conversion portion that converts a video signal input from the input terminal to generate a conversion signal, an input/output terminal that outputs the conversion signal, a detection portion that detects a signal input from the input/output terminal, a determination portion that determines whether the detected signal is a specific signal, and an output terminal that outputs the conversion signal in accordance with a determination result by the determination portion.

Advantageous Effects of Invention

According to the present invention, a video signal processing apparatus that automatically switches between input and output functions of a terminal can be provided.

DESCRIPTION OF EMBODIMENTS

Video Signal Processing Apparatus

Embodiments of a video signal processing apparatus (hereinafter, referred to as a "present apparatus") according to the present invention will now be described with reference to the attached drawings.

Configuration of Video Signal Processing Apparatus

Figure 1:
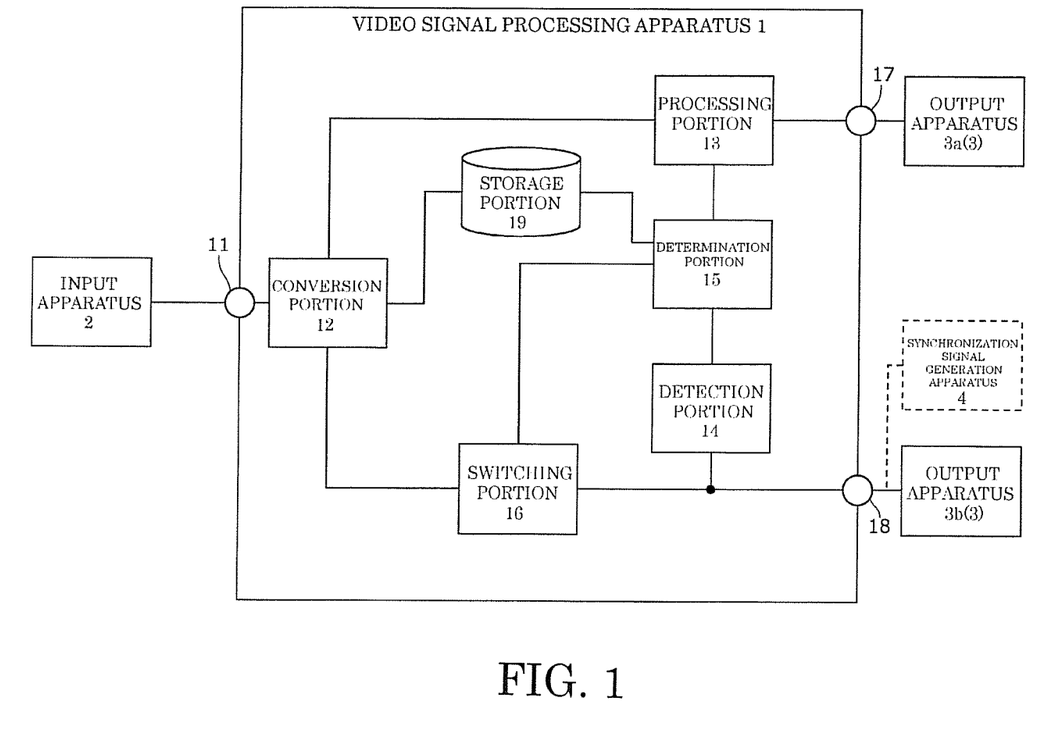
FIG. 1 is a functional block diagram showing an embodiment of a video signal processing apparatus according to the present invention.

FIG. 1 is a functional block diagram showing an embodiment of the present apparatus.

A present apparatus 1 is connected between an input apparatus 2 and output apparatuses 3 (3a, 3b), converts a video signal input from the input apparatus 2 in accordance with the output apparatuses 3, and outputs the converted signal to the output apparatuses 3. The present apparatus 1 is, for example, a scan converter. The present apparatus 1 includes an input terminal 11, a conversion portion 12, a processing portion 13, a detection portion 14, a determination portion 15, a switching portion 16, an output terminal 17, an input/output terminal 18, and a storage portion 19.

The input apparatus 2 is a video output apparatus such as a PC and a video camera that outputs the video signal. The input apparatus 2 is connected to the input terminal 11.

The output apparatuses 3 are display apparatuses such as monitors that display a video based on the video signal or on a processing signal which will be described later. The output apparatuses 3 are connected to the output terminal 17 or the input/output terminal 18.

As will be described later, to the input/output terminal 18, instead of the output apparatus 3, a synchronization signal generation apparatus 4 is connected in some cases. The synchronization signal generation apparatus 4 generates and outputs a synchronization signal for determining timing at which the present apparatus 1 displays the video signal from the input apparatus 2.

The synchronization signal is what is called a GenLock (generation lock) signal such as a black burst signal of National Television System Committee (NTSC), a binary composite synchronization signal of 480i, and a binary or ternary composite synchronization signal of 1080i. The synchronization signal is a specific signal in the present invention.

The input terminal 11 is connected to the input apparatus 2 and receives the video signal from the input apparatus 2. The input terminal 11 outputs the video signal to the conversion portion 12. The input terminal 11 is, for example, a bayonet neill concelman (BNC) terminal. The video signal is, for example, a serial digital interface (SDI) signal conforming to standards of Society of Motion Picture and Television Engineers (SMPTE).

The input terminal in the present invention may be a high-definition multimedia interface (HDMI (registered trademark)) terminal. The video signal may be, for example, a transition minimized differential signaling (TMDS) signal or a digital visual interface (DVI) signal.

The conversion portion 12 converts the video signal input from the input terminal 11 and generates a conversion signal. The conversion portion 12 outputs the conversion signal to the processing portion 13 and the switching portion 16. Operations of the conversion portion 12 and the conversion signal will be described later.

The processing portion 13 processes the conversion signal to generate a processing signal in accordance with a determination result by the determination portion 15. The processing portion 13 outputs any one signal of the conversion signal and the processing signal in accordance with the determination result by the determination portion 15 to the output terminal 17. Operations of the processing portion 13 and the processing signal will be described later.

The detection portion 14 detects a signal input from the input/output terminal 18. Operations of the detection portion 14 and the signal input from the input/output terminal 18 will be described later.

The determination portion 15 determines whether the signal detected by the detection portion 14 is the specific signal. The determination result by the determination portion 15 is output to the processing portion 13 and the switching portion 16. Operations of the determination portion 15 will be described later.

The switching portion 16 determines whether to output the conversion signal to the input/output terminal 18 in accordance with the determination result by the determination portion 15. That is, the switching portion 16 determines whether to output the conversion signal from the input/output terminal 18 in accordance with the determination result by the determination portion 15. Operations of the switching portion 16 will be described later.

The conversion portion 12, the processing portion 13, the detection portion 14, the determination portion 15, and the switching portion 16 are configured by, for example, a processor such as a central processing unit (CPU), a micro processing unit (MPU), and a digital signal processor (DSP) or an integrated circuit such as an application specific integrated circuit (ASIC) and a field programmable gate array (FPGA).

It should be noted that the conversion portion, the processing portion, the detection portion, the determination portion, and the switching portion in the present invention may be configured by, for example, one processor or one integrated circuit or may be configured by multiple processors or multiple integrated circuits.

The output terminal 17 outputs the conversion signal or the processing signal to the output apparatus 3(3*a*) in accordance with the determination result by the determination portion 15. The output terminal 17 is a second terminal in the present invention. The output terminal 17 is, for example, a BNC terminal.

The input/output terminal 18 outputs the conversion signal from the switching portion 16 to the output apparatus 3(3*b*), receives a signal from the synchronization signal generation apparatus 4, which will be described later, and outputs the received signal to the determination portion 15. That is, the input/output terminal 18 is a terminal having a function as an input terminal to which a signal is input and a function as an output terminal from which a signal is output. The input/output terminal 18 is a first terminal in the present invention. The input/output terminal 18 is, for example, a BNC terminal of the same standard as the output terminal 17.

The storage portion 19 stores therein information necessary for executing processing, which will be described later, by the present apparatus 1. The storage portion 19 is configured by, for example, a random access memory (RAM) or a semiconductor memory element such as a flash memory. The information that is stored in the storage portion 19 will be described later.

Operations of Video Signal Processing Apparatus

Next, operations of the present apparatus 1 will be described. The present apparatus 1 has two operation modes of an output mode and an input mode. The operation mode is switched to either of the output mode or the input mode in accordance with the determination result by the determination portion 15.

Output Mode

Figure 2:
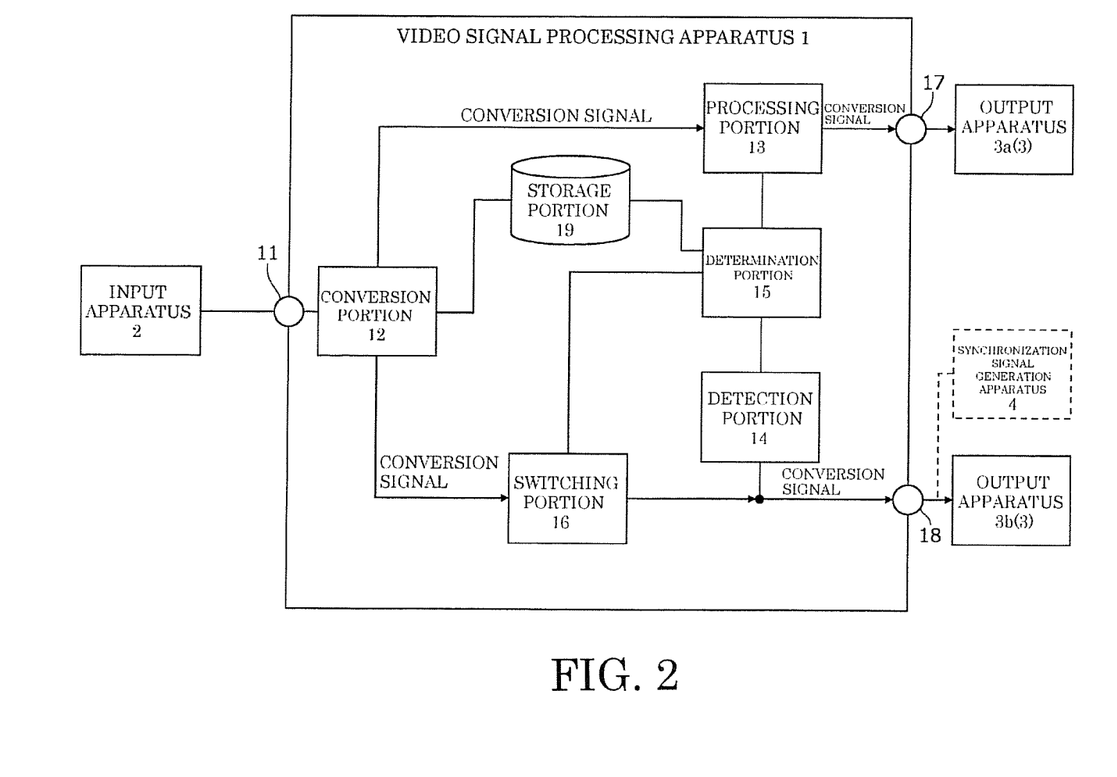
FIG. 2 is a functional block diagram showing a flow of signals when the video signal processing apparatus in FIG. 1 operates in an output mode.

FIG. 2 is a functional block diagram showing a flow of signals when the present apparatus 1 operates in the output mode. FIG. 2 illustrates the flow of the signals in a state in which the input apparatus 2 is connected to the input terminal 11, the output apparatus 3*a* is connected to the output terminal 17, and the output apparatus 3*b* is connected to the input/output terminal 18. That is, FIG. 2 illustrates the flow of the signals in a state in which the synchronization signal generation apparatus 4 is not connected to the input/output terminal 18.

The output mode is the operation mode in which the input/output terminal 18 functions as the output terminal. When the present apparatus 1 is in the output mode, the present apparatus 1 converts the video signal input to the input terminal 11 to generate the conversion signal in accordance with the output apparatuses 3, and outputs the conversion signal from the output terminal 17 and the input/output terminal 18.

The conversion portion 12 converts a synchronization frequency (hereinafter, referred to as an "input synchronization frequency") of the video signal from the input device 2 to a synchronization frequency (hereinafter, referred to as an "output synchronization frequency") in accordance with the output apparatus 3*a* connected to the output terminal 17 and the output apparatus 3*b* connected to the input/output terminal 18 to generate the conversion signal. That is, the conversion signal is a signal that converts the input synchronization frequency of the video signal into the output synchronization frequency in accordance with the output apparatuses. A relation between the input synchronization frequency and the output synchronization frequency is stored in the storage portion 19 in advance. The conversion portion 12 outputs the conversion signal to the processing portion 13 and the switching portion 16.

It should be noted that the conversion portion in the present invention may change the relation between the input synchronization frequency and the output synchronization frequency by, for example, a switching operation on a dip switch or the like.

The processing portion 13 outputs the conversion signal from the conversion portion 12 to the output terminal 17 without processing the conversion signal from the conversion portion 12. The output terminal 17 outputs the conversion signal to the output apparatus 3a.

On the other hand, the switching portion 16 outputs the conversion signal from the conversion portion 12 to the input/output terminal 18. The input/output terminal 18 outputs the conversion signal to the output apparatus 3b.

As described above, the present apparatus 1 outputs the conversion signal from the output terminal 17 and the input/output terminal 18 when the present apparatus 1 operates in the output mode.

Input Mode

Figure 3:
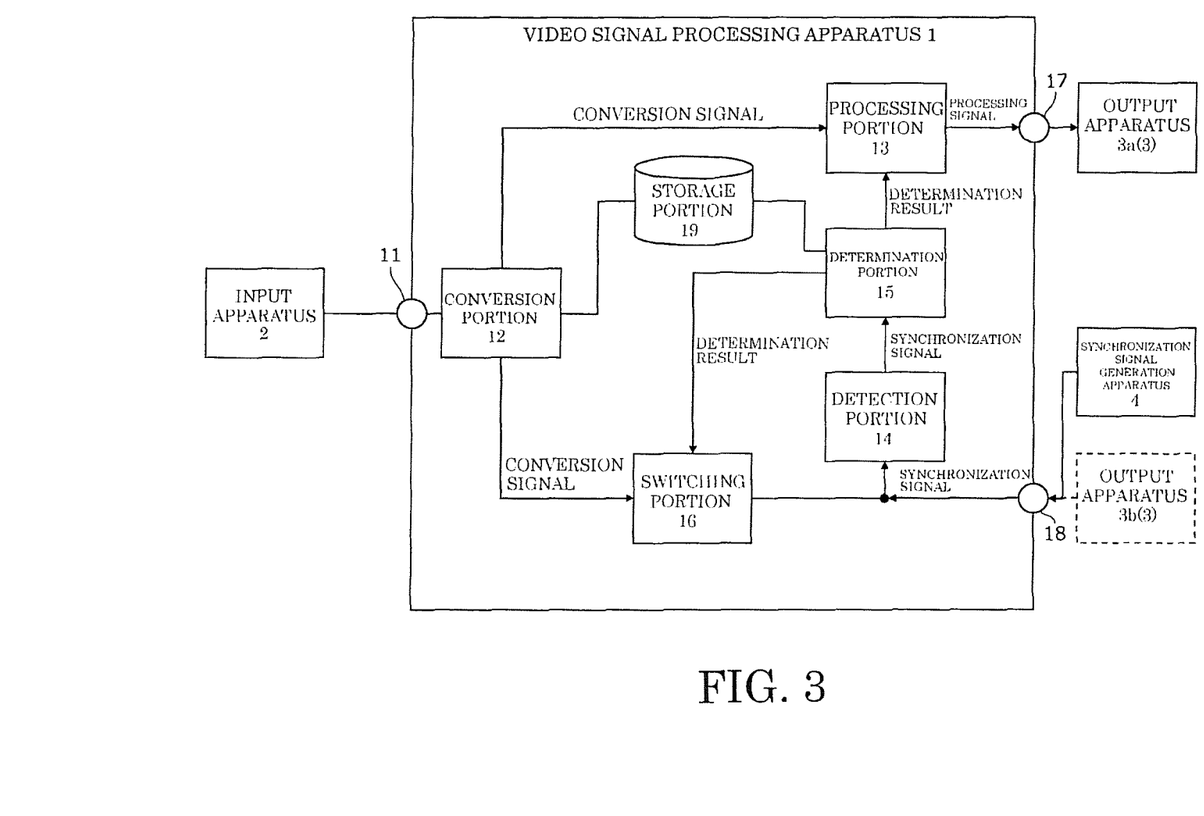
FIG. 3 is a functional block diagram showing a flow of signals when the video signal processing apparatus in FIG. 1 operates in an input mode.

FIG. 3 is a functional block diagram showing a flow of signals when the present apparatus 1 operates in the input mode. FIG. 3 illustrates the flow of the signals in a state in which the input apparatus 2 is connected to the input terminal 11, the output apparatus 3a is connected to the output terminal 17, and the synchronization signal generation apparatus 4 is connected to the input/output terminal 18.

The input mode is the operation mode in which the input/output terminal 18 functions as the input terminal. When the present apparatus 1 is in the input mode, the present apparatus 1 converts the video signal input to the input terminal 11 to generate the conversion signal in accordance with the output apparatuses 3, synchronizes the conversion signal with the synchronization signal input to the input/output terminal 18 to generate the processing signal, and outputs the processing signal from the output terminal 17.

Operations of the conversion portion 12 in the input mode are the same as the operations of the conversion portion 12 in the output mode. That is, the conversion portion 12 generates the conversion signal and outputs the conversion signal to the processing portion 13 and the switching portion 16.

The processing portion 13 receives the synchronization signal from the input/output terminal 18 via the detection portion 14 and the determination portion 15. The processing portion 13 synchronizes the conversion signal with the synchronization signal (matches a phase of the conversion signal with a phase of the synchronization signal) to generate the processing signal and outputs the processing signal to the output terminal 17. The output terminal 17 outputs the processing signal to the output apparatus 3a. That is, the present apparatus 1 implements what is called the GenLock function based on the synchronization signal from the synchronization signal generation apparatus 4.

On the other hand, the switching portion 16 does not output the conversion signal to the input/output terminal 18 when the present apparatus 1 operates in the input mode.

Switching Operation Between Output Mode and Input Mode

As described above, the present apparatus 1 switches between the output mode and the input mode in accordance with the determination result by the determination portion 15.

Figure 4:
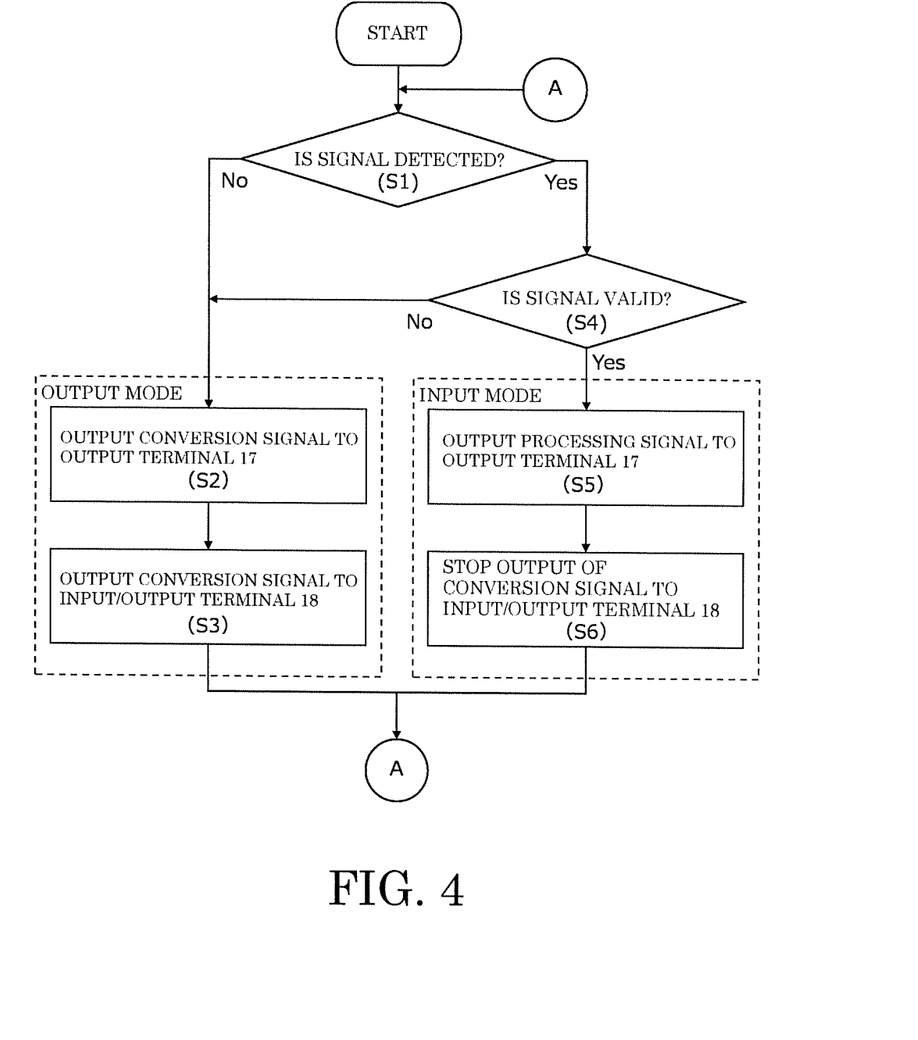
FIG. 4 is a flowchart showing a switching operation of operation modes of the video signal processing apparatus in FIG. 1.

FIG. 4 is a flowchart showing a switching operation of the operation modes of the present apparatus 1.

The present apparatus 1 detects presence of the synchronization signal from the input/output terminal 18 using the detection portion 14 and switches between the operation modes using the determination portion 15 and the switching portion 16.

The detection portion 14 detects presence of the signal from the input/output terminal 18 in both of the output mode and the input mode (S1). In this case, the detection portion 14 detects the presence of the signal from the input/output terminal 18 regardless of presence of an input of the video signal to the present apparatus 1 from the input apparatus 2 (an output of the conversion signal or the processing signal from the present apparatus 1). The signal that the detection portion 14 detects is the synchronization signal from the synchronization signal generation apparatus 4.

The synchronization signal is a composite signal of an analog video system, the frequency thereof being approximately 15 kHz to 64 kHz. Thus, the frequency of the synchronization signal is much lower than the frequency (approximately 270 MHz to 3 GHz) of the video signal (for example, the SDI signal) that the present apparatus 1 inputs and outputs. The detection portion 14 detects the presence of the signal from the input/output terminal 18 by detecting presence of a signal in a frequency band (approximately 15 kHz to 64 kHz) of the synchronization signal.

When the detection portion 14 detects no signal from the input/output terminal 18 ("No" at S1), the present apparatus 1 operates in the output mode. That is, the processing portion 13 outputs the conversion signal from the conversion portion 12 to the output terminal 17 without processing it (S2). The switching portion 16 outputs the conversion signal from the conversion portion 12 (S3) to the input/output terminal 18. That is, when the detection portion 14 detects no signal, the output terminal 17 outputs the conversion signal and the input/output terminal 18 outputs the conversion signal.

It should be noted that the processing by the processing portion in the output mode may be executed simultaneously with the processing by the switching portion or may be executed after the processing by the switching portion.

When the detection portion 14 detects the signal from the input/output terminal 18 ("Yes" at S1), the determination portion 15 determines whether the signal detected by the detection portion 14 (hereinafter, referred to as a "detection signal") is a valid synchronization signal (S4).

The determination portion 15 determines whether the detection signal is the valid synchronization signal based on a frequency spectrum of the detection signal. The frequency spectrum of the synchronization signal of the analog video system has a property of being maximum at approximately 15 kHz to 64 kHz. First, the determination portion 15 generates the frequency spectrum of the detection signal. Then, the determination portion 15 determines validity of the synchronization signal by comparing the intensity of the generated frequency spectrum at approximately 15 kHz to 64 kHz and a time during which the detection portion 14 detects the detection signal with predetermined thresholds. The thresholds are stored in the storage portion 19 in advance. As described above, the present apparatus 1 can easily determine the validity of the synchronization signal as the determination portion 15 executes the determination based on the frequency spectrum in the frequency band of the synchronization signal in a limited manner.

When both of the intensity and the time are equal to or more than the thresholds ("Yes" at S4), the determination portion 15 determines that the detection signal is the valid synchronization signal. The determination portion 15 outputs, to the processing portion 13 and the switching portion 16, a determination result that the detection signal is the valid synchronization signal (hereinafter, referred to as a "valid determination result").

When the determination result by the determination portion 15 is the valid determination result ("Yes" at S4), the present apparatus 1 operates in the input mode. That is, the processing portion 13 generates the processing signal based on the synchronization signal from the input/output terminal 18 and outputs the processing signal to the output terminal 17 (S5). The switching portion 16 stops output of the conversion signal from the conversion portion 12 to the input/output terminal 18 (S6). In other words, when the determination result by the determination portion 15 is the valid determination result, the switching portion 16 makes a decision not to output the conversion signal from the input/output terminal 18. That is, when the detection signal is the valid synchronization signal, the output terminal 17 outputs the processing signal and the input/output terminal 18 functions as the input terminal of the synchronization signal (outputs no signal).

It should be noted that the processing by the processing portion in the input mode may be executed simultaneously with the processing by the switching portion or may be executed after the processing by the switching portion.

When either of the intensity or the time is lower than the threshold ("No" at S4), the determination portion 15 determines that the detection signal is an invalid synchronization signal (for example, a noise signal), that is, the detection signal is not the synchronization signal. The determination portion 15 outputs, to the processing portion 13 and the switching portion 16, a determination result that the detection signal is the invalid synchronization signal (hereinafter, referred to as an "invalid determination result").

When the determination result by the determination portion 15 is the invalid determination result ("No" at S4), the present apparatus 1 operates in the output mode. That is, the processing portion 13 outputs the conversion signal from the conversion portion 12 to the output terminal 17 without processing it (S2). The switching portion 16 outputs the conversion signal from the conversion portion 12 (S3) to the input/output terminal 18. In other words, when the determination result by the determination portion 15 is the invalid determination result, the switching portion 16 makes a decision to output the conversion signal from the input/output terminal 18.

As described above, when the detection signal is the synchronization signal, the processing portion 13 generates the processing signal and outputs the processing signal to the output terminal 17 and the switching portion 16 stops output of the conversion signal to the input/output terminal 18. In this case, the input/output terminal 18 functions as the input terminal of the valid synchronization signal. On the other hand, when the detection signal is not the synchronization signal, the processing portion 13 outputs the conversion signal to the output terminal 17 and the switching portion 16 outputs the conversion signal to the input/output terminal 18. In this case, the input/output terminal 18 functions as the input terminal of the detection signal and functions as the output terminal of the conversion signal. In other words, the input/output terminal 18 functions as the input terminal of the detection signal all the time and also functions as the output terminal of the conversion signal when the determination result by the determination portion 15 is the invalid determination result. That is, the present apparatus 1 determines whether the apparatus connected to the input/output terminal 18 is the synchronization signal generation apparatus 4 in accordance with the determination result by the determination portion 15 and automatically switches between the input and output functions of the input/output terminal 18.

Conclusion

According to the embodiment described above, the present apparatus 1 includes the input/output terminal 18 that outputs the conversion signal, the detection portion 14 that detects the signal input from the input/output terminal 18, the determination portion 15 that determines whether the detection signal is the synchronization signal, and the output terminal 17 that outputs the conversion signal in accordance with the determination result. The present apparatus 1 switches whether to output the conversion signal from the output terminal 17 in accordance with the determination result (signal from the apparatus connected to the input/output terminal 18). That is, the present apparatus 1 causes the input/output terminal 18 to function as the input terminal when the synchronization signal is input from the apparatus connected to the input/output terminal 18. On the other hand, the present apparatus 1 causes the input/output terminal 18 to function as the output terminal when no synchronization signal is input from the apparatus connected to the input/output terminal 18. As described above, the present apparatus 1 automatically switches between the input and output functions of the input/output terminal 18 in accordance with the signal from the apparatus connected to the input/output terminal 18, that is, without a switch operation as in the conventional technique.

In addition, according to the embodiment described above, the present apparatus 1 includes the processing portion 13. When the detection signal is the synchronization signal, the processing portion 13 synchronizes the conversion signal with the synchronization signal to generate the processing signal and outputs the processing signal to the output terminal 17. On the other hand, when the detection signal is not the synchronization signal, the processing portion 13 outputs the conversion signal to the output terminal 17. That is, the processing portion 13 generates the processing signal in accordance with the determination result. Thus, the present apparatus 1 can switch whether to output the conversion signal from the output terminal 17 or to output the processing signal from the output terminal 17 in accordance with the determination result (signal from the apparatus connected to the input/output terminal 18).

Furthermore, according to the embodiment described above, the present apparatus 1 includes the switching portion 16. When the detection signal is the synchronization signal, the switching portion 16 stops output of the conversion signal to the input/output terminal 18, whereas when the detection signal is not the synchronization signal, the switching portion 16 outputs the conversion signal to the input/output terminal 18. That is, the present apparatus 1 can determine whether the apparatus connected to the input/output terminal 18 is the synchronization signal generation apparatus 4 in accordance with the determination result by the determination portion 15 and automatically switch between the input and output functions of the input/output terminal 18.

Furthermore, according to the embodiment described above, when the detection signal is the synchronization signal, the switching portion 16 stops output of the conversion signal to the input/output terminal 18. That is, the present apparatus 1 does not output the conversion signal from the input/output terminal 18 in the input mode. That is, the detection portion 14 detects a signal from the input/output terminal 18 without being influenced by a noise signal based on the conversion signal. The determination portion 15 can determine whether the detection signal is the valid synchronization signal without being influenced by the noise signal based on the conversion signal. As described above, detection accuracy of the detection portion 14 and accuracy of the determination result by the determination portion 15 are improved. As a result, the present apparatus 1 can specify an accurate phase of the synchronization signal without being influenced by the noise signal based on the conversion signal. That is, accuracy of the GenLock function of the present apparatus 1 is improved.

It should be noted that the present apparatus may include a first circuit appropriate for the processing in the output mode (output processing of a digital signal), a second circuit appropriate for processing in the input mode (input processing of an analog signal), and a micro processor serving as a selection portion that selects either of the first circuit or the second circuit in accordance with the determination result by the determination portion. That is, when the detection signal is not the synchronization signal (in the output mode), the present apparatus operates using the first circuit, whereas when the detection signal is the synchronization signal (in the input mode), the present apparatus operates using the second circuit. As a result, the present apparatus can specify an accurate phase of the synchronization signal using the second circuit without being influenced by the digital signal (conversion signal) (such as the noise signal).

It is sufficient that the present apparatus includes at least one input/output terminal, and the number of output terminals and the number of input/output terminals are not limited to those in the embodiment. That is, for example, the present apparatus may include multiple input/output terminals or include only the input/output terminals. In this case, the detection portion is configured to detect signals from the respective input/output terminals. The processing portion is configured to output the processing signal or the conversion signal to the input/output terminal functioning as the output terminal.

Further, the present apparatus according to the embodiment described above includes the conversion portion and the processing portion separately. Instead, the present apparatus may include a conversion processing portion functioning as both of the conversion portion and the processing portion.

Figure 5:
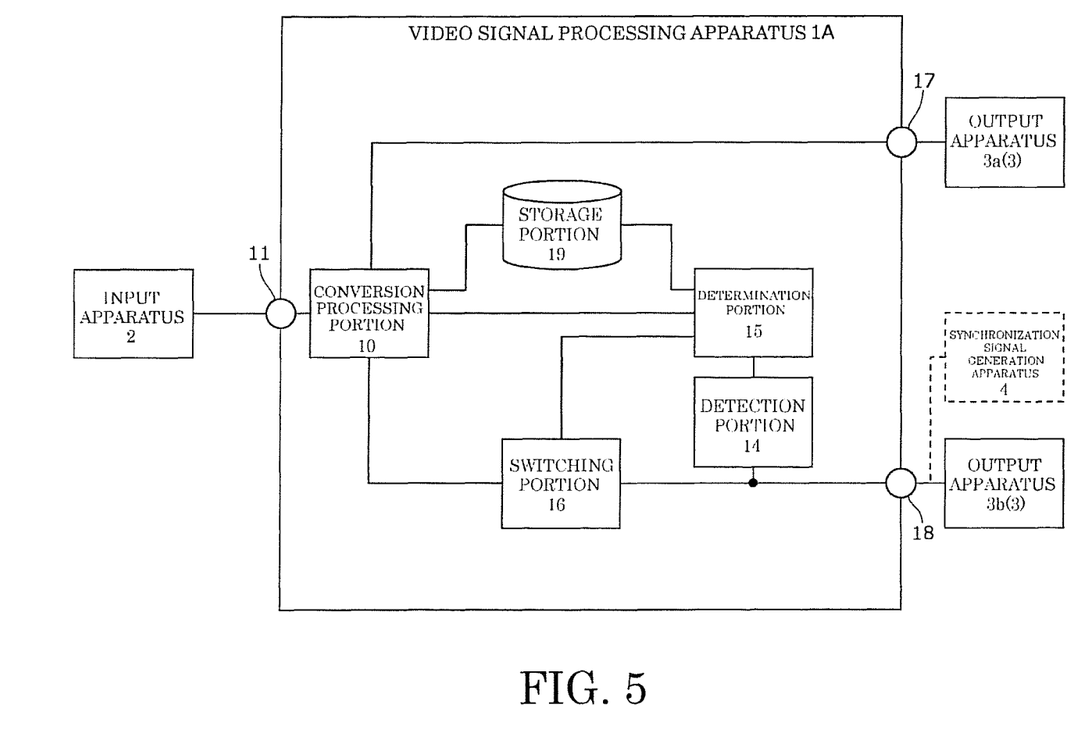
FIG. 5 is a functional block diagram showing another embodiment of the video signal processing apparatus according to the present invention.

FIG. 5 is a functional block diagram showing another embodiment of the present apparatus.

FIG. 5 illustrates that a present apparatus 1A is an audio signal processing apparatus that includes a conversion processing portion 10, the input terminal 11, the detection portion 14, the determination portion 15, the switching portion 16, the output terminal 17, the input/output terminal 18, and the storage portion 19. The input terminal 11, the detection portion 14, the determination portion 15, the switching portion 16, the output terminal 17, the input/output terminal 18, and the storage portion 19 included in the present apparatus 1A have the same functions as those of the input terminal 11, the detection portion 14, the determination portion 15, the switching portion 16, the output terminal 17, the input/output terminal 18, and the storage portion 19 included in the present apparatus 1 in the embodiment described above.

The conversion processing portion 10 converts a video signal input from the input terminal 11 to generate a conversion signal, and processes the conversion signal in accordance with the determination result by the determination portion 15 to generate a processing signal. That is, the conversion processing portion 10 has the function as the conversion portion 12 and the function as the processing portion 13 in the embodiment described above. The conversion processing portion 10 outputs any one signal of the conversion signal and the processing signal in accordance with the determination result by the determination portion 15 to the switching portion 16 and the output terminal 17.

The invention claimed is:

1. A video signal processing apparatus comprising:
an input terminal;
an input/output terminal configured to output a conversion signal and receive a signal input;
one or more processors configured to
convert a video signal input from the input terminal to generate the conversion signal;
detect the signal input from the input/output terminal;
determine whether the detected signal is a synchronization signal; and
an output terminal configured to output both the conversion signal and a processing signal in accordance with a result of the determination, only one of the conversion signal and the processing signal being output at a time, wherein
the processing signal is a signal generated by synchronizing the conversion signal with the signal input from the input/output terminal,
the input/output terminal is connectable to only one of an output apparatus and a synchronization signal generation apparatus at a time,
when the input/output terminal is connected to the output apparatus, the output terminal outputs the conversion signal, and
when the input/output terminal is connected to the synchronization signal generation apparatus, the output terminal outputs the processing signal.

2. The video signal processing apparatus according to claim 1, wherein the one or more processors are further configured to
process the conversion signal to generate the processing signal and output the processing signal to the output terminal in accordance with the determination result.

3. The video signal processing apparatus according to claim 2, wherein when the detected signal is the synchronization signal, the one or more processors generate the processing signal based on the synchronization signal.

4. The video signal processing apparatus according to claim 2, wherein when the detected signal is not the synchronization signal, the one or more processors output the conversion signal to the output terminal.

5. The video signal processing apparatus according to claim 2, wherein the one or more processors synchronize the conversion signal with the synchronization signal to generate the processing signal.

6. The video signal processing apparatus according to claim 2, wherein the one or more processors convert an input synchronization frequency of the video signal to an output synchronization frequency in accordance with an output apparatus connected to the output terminal.

7. The video signal processing apparatus according to claim 1, wherein the one or more processors are further configured to
determine whether to output the conversion signal from the input/output terminal in accordance with the determination result by the determination.

8. The video signal processing apparatus according to claim 7, wherein when the detected signal is the synchronization signal, the one or more processors are configured to stop output of the conversion signal to the input/output terminal.

9. The video signal processing apparatus according to claim 7, wherein when the detected signal is not the synchronization signal, the one or more processors are configured to output the conversion signal to the input/output terminal.

10. The video signal processing apparatus according to claim 1, wherein the one or more processors determine whether the detected signal is the synchronization signal based on a frequency spectrum of the detected signal.

11. The video signal processing apparatus according to claim 1, wherein when the one or more processors detect no signal,
the input/output terminal outputs the conversion signal, and
the output terminal outputs the conversion signal.

12. A video signal processing apparatus comprising:
an input terminal;
an output terminal configured to output both a conversion signal and a processing signal, only one of the conversion signal and the processing signal being output at a time;
an input/output terminal configured to output the conversion signal and receive a signal input; and
one or more processors configured to
convert a video signal input from the input terminal to generate a conversion signal;
detect the signal input from the input/output terminal;
determine whether the detected signal is a synchronization signal; and
determine whether to output the conversion signal from the input/output terminal in accordance with a result of the determination of whether the detected signal is the synchronization signal, wherein
the processing signal is a signal generated by synchronizing the conversion signal with the signal input from the input/output terminal,
the input/output terminal is connectable to only one of an output apparatus and a synchronization signal generation apparatus at a time,
when the input/output terminal is connected to the output apparatus, the output terminal outputs the conversion signal and the one or more processors determine the input/output terminal outputs the conversion signal, and
when the input/output terminal is connected to the synchronization signal generation apparatus, the output terminal outputs the processing signal and the one or more processors determine the input/output terminal does not output the conversion signal.

13. The video signal processing apparatus according to claim 12, wherein when the detected signal is the synchronization signal, the one or more processors stop output of the conversion signal to the input/output terminal.

14. The video signal processing apparatus according to claim 12, wherein when the detected signal is not the synchronization signal, the one or more processors output the conversion signal to the input/output terminal.

15. The video signal processing apparatus according to claim 12, the one or more processors being further configured to
process the conversion signal to generate a processing signal; and
output the conversion signal or the processing signal to the output terminal in accordance with the result of the determination of whether the detected signal is the synchronization signal.

16. The video signal processing apparatus according to claim 15, wherein
the one or more processors generate the processing signal based on the synchronization signal, and
when the detected signal is the synchronization signal, the one or more processors output the processing signal to the output terminal.

17. The video signal processing apparatus according to claim 15, wherein when the detected signal is not the synchronization signal, the one or more processors output the conversion signal to the output terminal.

18. The video signal processing apparatus according to claim 12, wherein the one or more processors determine whether the detected signal is the synchronization signal based on a frequency spectrum of the detected signal.

19. The video signal processing apparatus according to claim 12, wherein the one or more processors convert an input synchronization frequency of the video signal to an output synchronization frequency in accordance with an output apparatus connected to the output terminal.

20. The video signal processing apparatus according to claim 15, wherein
the detected signal is the synchronization signal, and
the one or more processors synchronize the conversion signal with the synchronization signal to generate the processing signal.

* * * * *